United States Patent [19]

Morikawa

[11] Patent Number: 5,009,201
[45] Date of Patent: Apr. 23, 1991

[54] TWO-CYCLE ENGINE HAVING A DIRECT FUEL INJECTION SYSTEM

[75] Inventor: Koji Morikawa, Tokyo, Japan

[73] Assignee: Fuji Jukogyo Kabushiki Kaisha, Tokyo, Japan

[21] Appl. No.: 547,863

[22] Filed: Jul. 3, 1990

[30] Foreign Application Priority Data

Jul. 29, 1989 [JP] Japan .................................. 1-199135

[51] Int. Cl.⁵ .............................................. F02B 33/00
[52] U.S. Cl. .............................. 123/65 BA; 123/65 V
[58] Field of Search ................ 123/65 BA, 323, 65 V, 123/190 A, 559.1

[56] References Cited

U.S. PATENT DOCUMENTS

| | | | |
|---|---|---|---|
| 2,765,782 | 10/1956 | Cambeis et al. | 123/65 BA |
| 2,766,744 | 10/1956 | Steiger | 123/65 BA |
| 2,891,524 | 6/1959 | Scheiterlein | 123/65 BA |
| 2,924,069 | 2/1960 | Buchi | 123/65 BA |
| 3,077,189 | 2/1963 | Earnshaw et al. | 123/65 BA |
| 3,187,728 | 6/1965 | Friddell | 123/65 BA |
| 3,680,305 | 8/1972 | Miller | 123/65 BA |
| 4,162,662 | 7/1979 | Melchior | 123/65 BA |
| 4,254,752 | 3/1981 | Friddell et al. | 123/65 BA |
| 4,907,549 | 3/1990 | Morikawa et al. | 123/65 BA |
| 4,924,819 | 5/1990 | Boyesen | 123/323 |

FOREIGN PATENT DOCUMENTS

59-25031 2/1984 Japan .
62-111116 5/1987 Japan .

Primary Examiner—David A. Okonsky
Attorney, Agent, or Firm—Martin A. Farber

[57] ABSTRACT

A rotary exhaust valve is provided in an exhaust passage of an engine, which is rotated by the engine. A valve phase control device is provided for changing the phase of the rotary exhaust valve. An actuator is provided for actuating the valve phase control device so as to change the phase of the rotary exhaust valve in ac- /ith engine operating conditions.

3 Claims, 8 Drawing Sheets

TWO-CYCLE ENGINE HAVING A DIRECT FUEL INJECTION SYSTEM

BACKGROUND OF THE INVENTION

The present invention relates to a two-cycle engine provided with a direct fuel injection system, and more particularly to a control system for a rotary exhaust valve provided in an exhaust passage of the engine.

In a crankcase-scavenged two-cycle engine, a scavenge port and an exhaust port are opened and closed by a piston at predetermined timings. The timings of the opening and closing of the exhaust port are symetrically positioned with respect to a bottom dead center (BDC). The opening and closing of the scavenge port are also symetrically positioned. Since the exhaust port is still opened after the scavenge port is closed, mixture escapes from the exhaust port, and hence the combustible mixture in the cylinder is not sufficiently compressed. Therefore, output torque of the engine is small and fuel consumption and exhaust gas emission are bad.

In order to solve such a problem, a uniflow scavenge system provided with a valve system has been proposed for the two-cycle engine. However, it is unrealistic to actually use such an engine, because compactness which is one of merits of the crankcase-scavenged engine is impaired.

Japanese patent application Laid-Open No. 59-25031 discloses a two-cycle engine provided with a rotary valve in an exhaust passage, where a closing timing of the valve is controlled. Japanese patent application Laid-Open No. 62-111116 discloses a system for controlling an exhaust timing control valve for opening and closing an upper portion of the exhaust port in accordance with engine speed.

Although the scavenge and exhaust timings are properly controlled so that the opening and closing timings become unsymmetrical with respect to the BDC in the above-mentioned prior arts, the torque band which is effective to drive a vehicle is narrow and the torque itself is inevitably small because of the crankcase-scavenged two-cycle engine.

More particularly, in the crankcase-scavenged two-cycle engine, derivery ratio $l_O$, which is a ratio of intake air quantity to the displacement of the engine, is 1.0 at the most. In addition actual intake trapping efficiency, or charging efficiency of intake air in cylinders is generally lower than the estimated trapping efficiency which is calculated assuming that the air is mixed with residual gas as soon as it enters the cylinders (perfect mixing).

Although the intake ratio $l_O$ can be increased over the value of 1.0 to 1.5 by compressing intake air with a scavenge pump, the trapping efficiency decreases. On the other hand, since the optimum closing timing of the exhaust port for obtaining a maximum torque changes with an increase of engine speed, a wide torque range cannot be obtained if the exhaust port is closed at a fixed timing.

SUMMARY OF THE INVENTION

The object of the present invention is to provide a two-cycle engine where a rotary exhaust valve is controlled in accordance with engine operating conditions so that torque range is widened and the fuel consumption is improved.

According to the present invention, there is provided a two-cycle engine having at least one cylinder, a scavenge port, an exhaust port, an intake passage communicated with said scavenge port, an exhaust passage communicated with said exhaust port, a scavenge pump provided in said intake passage, an rotary exhaust valve provided in the exhaust passage, means for rotating the scavenge pump and said rotary exhaust valve respectively, and a fuel injector provided for injecting fuel directly in the cylinder.

The engine comprises detector means for detecting engine speed and load on the engine and for producing an operating condition signal, valve phase determining means responsive to said operating condition signal for determining a phase of said rotary exhaust valve and for producing a valve phase signal, valve phase control means for changing the phase of said rotary exhaust valve, an actuator responsive to said valve phase signal for actuating said valve phase control means whereby changing the phase of sad rotary exhaust valve in accordance with engine operating conditions.

In an aspect of the invention, the phase is advanced as the engine speed reduces.

These and other objects and features of this invention will become understood from the following description with reference to the accompanying drawings.

DETAILED DESCRIPTION OF THE PREFERRED EMBODIMENT

Figure 1A:
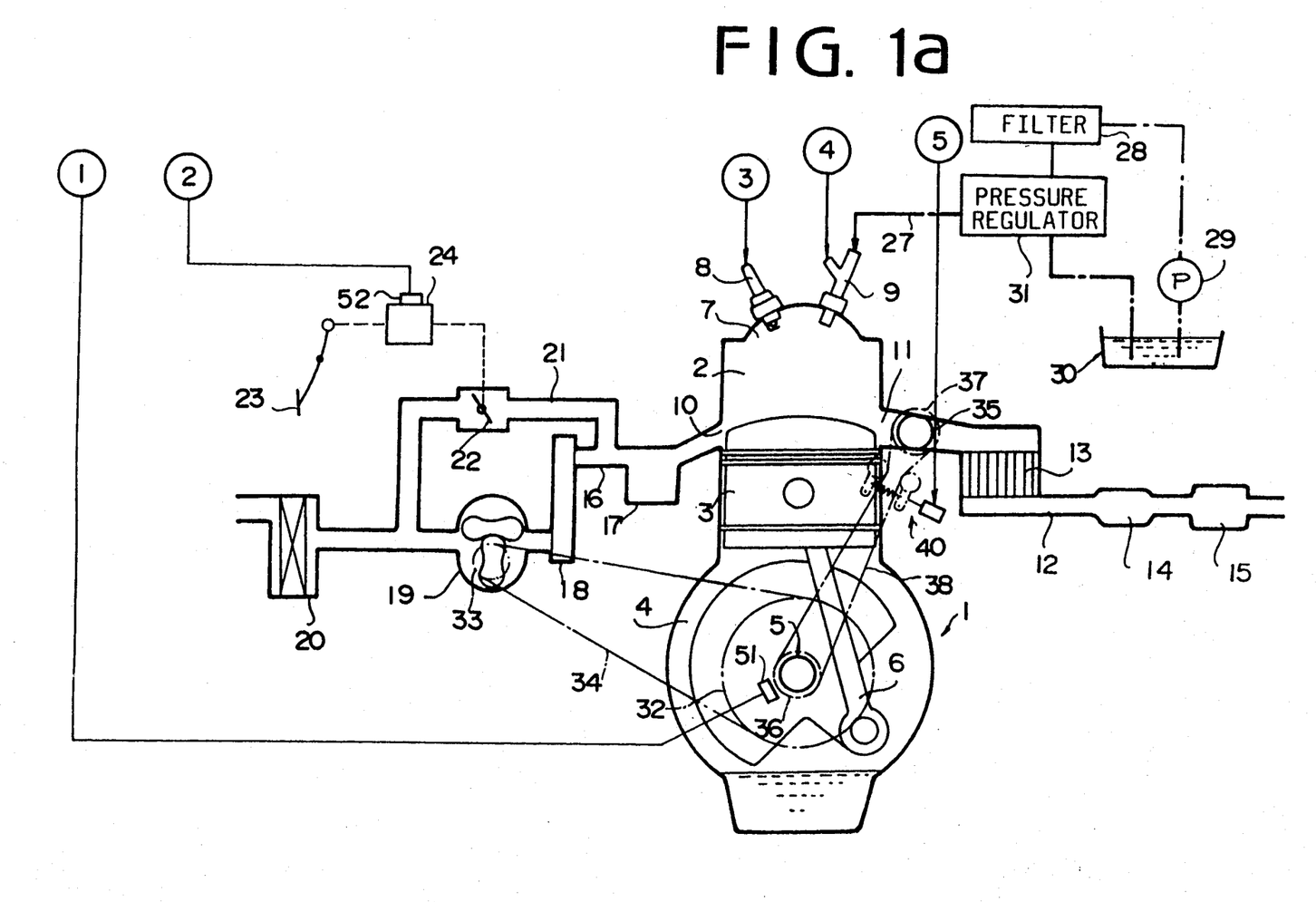
FIGS. 1a and 1b show a schematic diagram of a two-stroke cycle engine of the present invention.
Figure 1B:
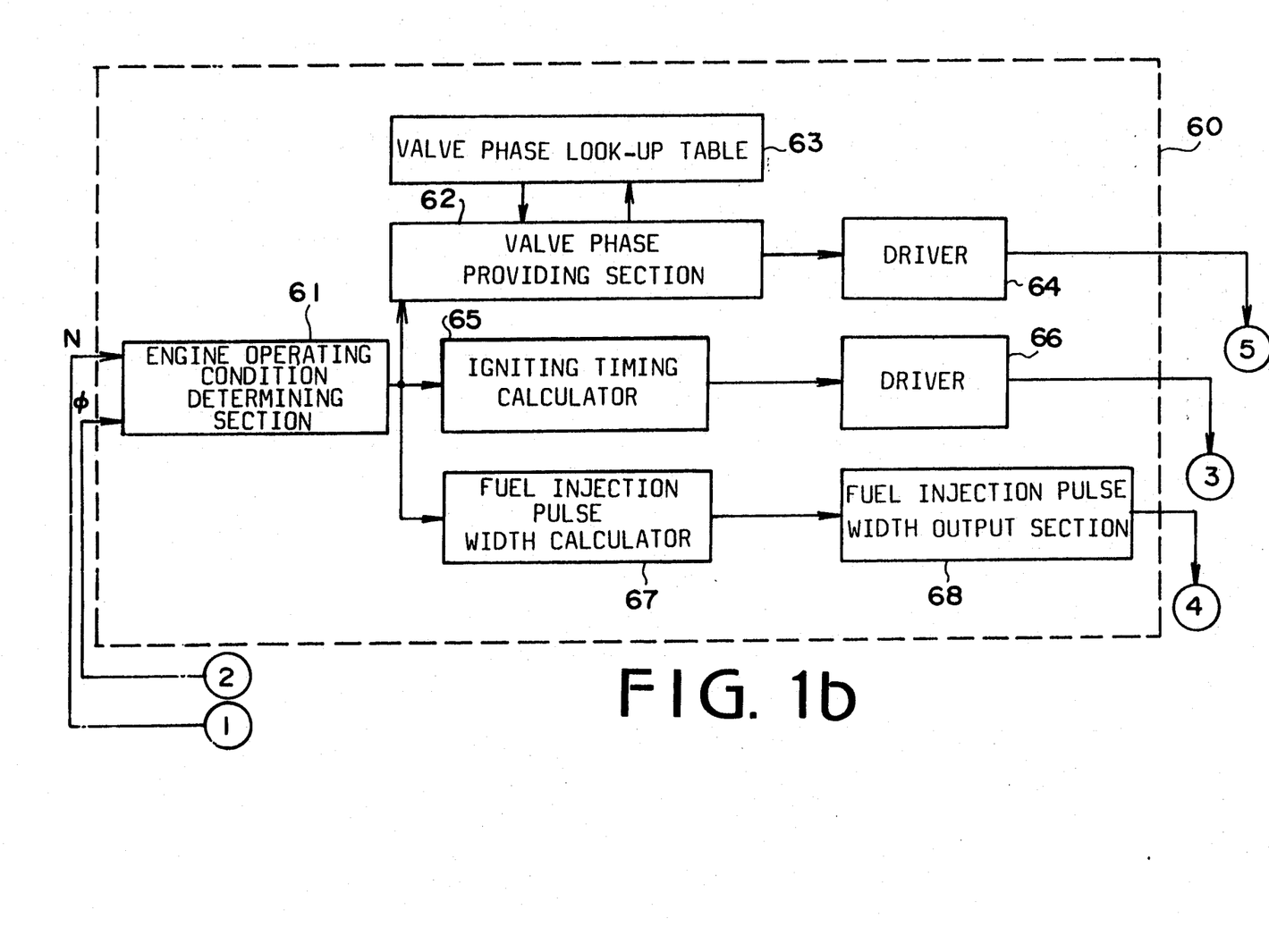

Referring to FIGS. 1a and 1b, a two-cycle engine 1 for a motor vehicle comprises a cylinder 2, a piston 3 provided in the cylinder 2, a connecting rod 6 connected with the piston 3 and a crankshaft 5 disposed in a crankcase 4.

In a wall of the cylinder 2, an exhaust port 11 and a scavenge port 10 are formed in 90 degrees angular disposition or opposing one another. The ports 10 and 11 are adapted to open at predetermined timings with respect to a position of the piston 3.

A fuel injector 9 and a spark plug 8 are provided at a top of a combustion chamber 7 of the cylinder 2. Fuel in a fuel tank 30 is supplied to the injector 9 through a fuel passage 27 having a filter 28, a pump 29 and a pressure regulator 31 for constantly maintaining the fuel at a predetermined pressure.

The engine 1 is supplied with air through an air cleaner 20, a scavenge pump 19, an intercooler 18 for cooling scavenge air and an intake pipe 16 having a scavenge chamber 17 for absorbing scavenge pressure waves when the scavenge port 10 is opened or closed. A bypass 21 is provided around the scavenge pump 19 and the intercooler 18. The bypass 21 is provided with a control valve 22. Exhaust gas of the engine 1 is discharged through the exhaust port 11, an exhaust pipe 21 having a catalytic converter 13, an exhaust chamber 14 and a muffler 15.

The scavenge pump 19 is operatively connected to the crankshaft 5 through a transmitting device comprising an endless belt 34 running over a crank pulley 32 and a pump pulley 33. The scavenge pump 19 is driven by the crankshaft 5 through the transmitting device for producing a scavenge pressure. The scavenge pump 19 is a displacement pump such as a Lysholm pump (helical lobe position displacement pump) or a Roots type rotary pump, which discharges constant volumetric displacement irrespective of the driving speed thereof. Capacity of the pump 19 is set so as to provide a delivery ratio of more than 1.0 in a high engine load range at any engine speed. Since the combustion chamber 7 of the engine 1 is scavenged by the pump 19 instead of the crankcase 4, it is possible to separate oil for lubrication of the engine 1 from the intake system.

An accelerator pedal 23 is operatively connected with the control valve 22 through a valve controller 24. The opening degree of the control valve 22 is controlled by the controller 24 so as to be inversely proportional to a depressing degree of the accelerator pedal 23.

Figure 2A:
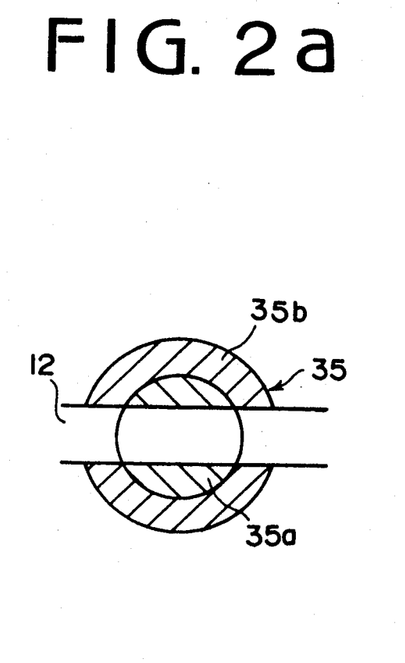
FIG. 2a is a sectional view showing a rotary exhaust valve.

A rotary exhaust valve 35 is provided in the exhaust pipe 12 downstream of the exhaust port 11 adjacent thereto. As shown in FIG. 2a, the rotary exhaust valve 35 comprises a rotary valve body 35a pivotally mounted in a body 35b. The rotary valve body 35a is operatively connected with the crankshaft 5 through a pulley and belt device comprising a crank pulley 36, a valve pulley 37 and a belt 38 so as to be driven by the engine 1. A valve phase controller 40 which is shown in detail in FIG. 2b is provided adjacent the belt 34.

Figure 2B:
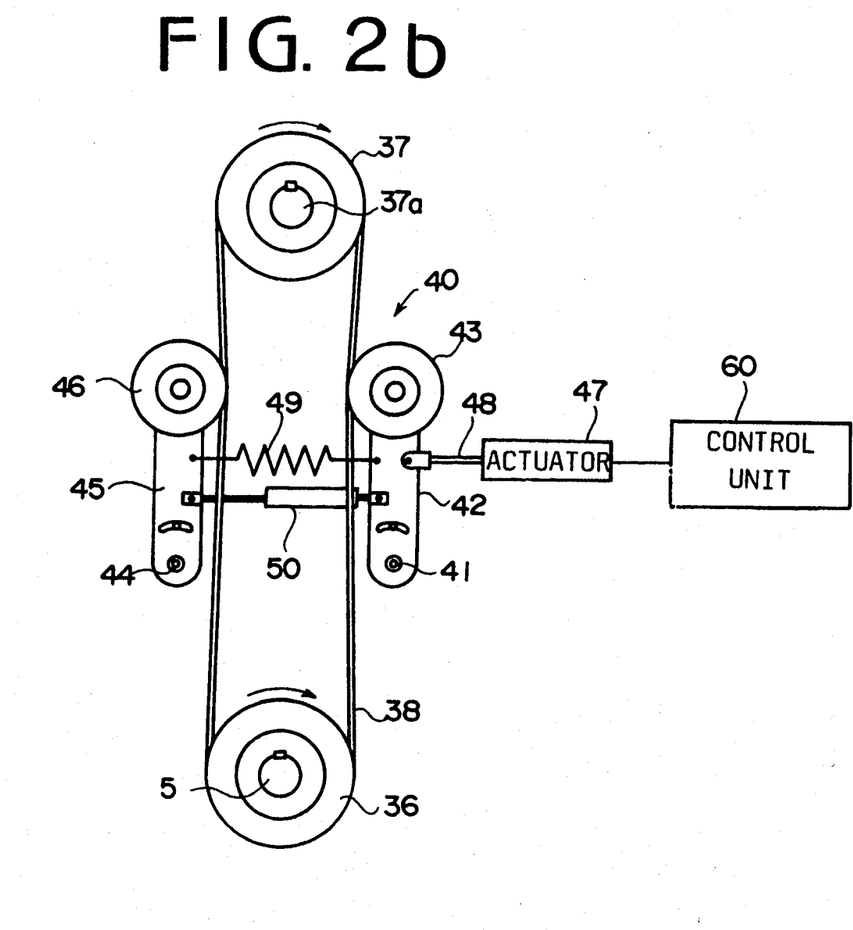
FIG. 2b is a schematic diagram showing a valve phase controller of a rotary exhaust valve of the present invention.

Referring to FIG. 2b, the valve pulley 37 is securely mounted on a rotary exhaust valve shaft 37a and the crank pulley 36 is securely mounted on the crankshaft 5. Since the crankshaft 5 rotates in the clockwise direction as shown by an arrow, right side of the belt 38 in the figure is a tension side and left side is loose side. The valve phase controller 40 comprises a tension pulley 43 which bears on the belt 38 at the tension side and an idler pulley 46 which bears on the belt at the loose side. The tension pulley 43 is rotatably mounted on an arm 42 which is pivotally mounted on a pivot 41 secured to a casing (not shown). The idler pulley 46 is rotatably mounted on an arm 45 which is pivotally mounted on a pivot 44 secured to a casing (not shown).

A rod 48 of an actuator 47 is connected to the arm 42 so as to control force exerted on the belt 38 through the tension pulley 43. The actuator 47 reciprocates the rod 48 in accordance with an output signal of a control unit 60, which will be described after, in dependency on operating conditions of the engine 1.

A spring 49 and an oil damper 50 are provided between the arms 42 and 45 to tense both sides of the belt 38. The oil damper 50 operates to prevent an abrupt movement of the arm 45 with the oil in the damper 50 when the arm 42 is quickly rotated, and to absorb the movement when the arm is slowly rotated.

Referring back to FIGS. 1a and 1b, an engine speed sensor 51 and an accelerator pedal depressing degree sensor 52 are provided for determining the engine operating condition. The control unit 60 comprises an engine operating condition determining section 61 to which an engine speed N and an accelerator pedal depressing degree $\phi$ are applied from the engine speed sensor 51 and the accelerator pedal depressing degree sensor 52. An output signal of the engine operating condition determining section 61 is fed to a valve phase providing section 62. The valve phase providing section 62 retrieves a valve phase from a phase look-up table 63 where a plurality of the valve phases designating the opening and closing timing of the rotary exhaust valve 35 with respect to the angular position of the crankshaft 5, are stored. A valve phase signal from the valve phase providing section 62 is applied to the actuator 47 of the valve phase controller 40 through a driver 64 to change the valve phase.

The output signal of the engine operating condition determining section 61 is further fed to a fuel injection pulse width calculator 67. A fuel injection pulse signal corresponding to the calculated fuel injection pulse width is applied to the injector 9 through a fuel injection pulse width output section 68. An ignition timing calculator 65 calculates an ignition timing in dependency on the output signal of the engine operating condition determining section 61. An ignition signal from the calculator 65 is applied to the spark plug 8 through a driver 66.

The operation of the two-cycle engine is described hereinafter.

The air supplied from the scavenge pump 19 and cooled at the intercooler 18 is returned to the inlet side of the scavenge pump 19 through the bypass 21. Since the opening degree $\phi$ of the control valve 22 is controlled to be inversely proportional to the depressing degree $\phi$ of the accelerator pedal 23, when the depressing degree $\phi$ of the accelerator pedal is small, the control valve 22 is largely opened. As a result, a large amount of the air is returned to the inlet side of the scavenge pump 19. Thus, a small amount of the air, which corresponds to the small accelerator pedal depressing degree, flows into the cylinder 2 for scavenging without causing pumping loss. As the depressing degree $\phi$ increases, the quantity of fresh air forced into the cylinder 2 increases with the closing of the control valve 22.

When the piston 3 reaches a position close to the bottom dead center as shown in FIG. 1a, the scavenge port 10 opens as well as the exhaust port 11 so that intake air, quantity of which depends on the position of the accelerator pedal 23, is delivered by the scavenge pump 19 into the cylinder 2 through the intercooler 18 and the scavenge port 10. Consequently, burned gas in the cylinder 2 is scavenged so that fresh intake air is induced therein in a short time. During the compression stroke, the piston 3 goes up, closing both ports 10 and 11. The fuel is injected from the injector 9 in accordance with the fuel injection pulse signal from the control unit 60 at a high pressure to form a combustible mixture in the chamber 7. The mixture is swirled in the combustion chamber with the scavenging air and ignited by the spark plug 8 immediately before the top dead center. After the explosion, the piston 3 descends for a power stroke. Accordingly, the exhaust port 11 is opened so that high pressurized burned gas in the cylinder 2 escapes. The piston 3 further descends, thereby returning to the afore-described intake stroke where the cylinder 2 is scavenged.

During the operation, the rotary valve body 35a provided in the exhaust pipe 12 rotates in accordance with the rotation of the crankshaft 5 through the crank pulley 36, belt 38, valve pulley 37 and the valve shaft 37a. The exhaust valve 35 is adapted to be closed while the scavenge port 10 is opened to induce the fresh air into the cylinder 2. Consequently, although the exhaust port 11 is not yet closed by the piston 3, the fresh air is prevented from escaping.

The control operation of the rotary exhaust valve 35 is described hereinafter with reference to FIG. 3, FIGS. 4a to 4c and FIGS. 5a to 5c.

Figure 3:
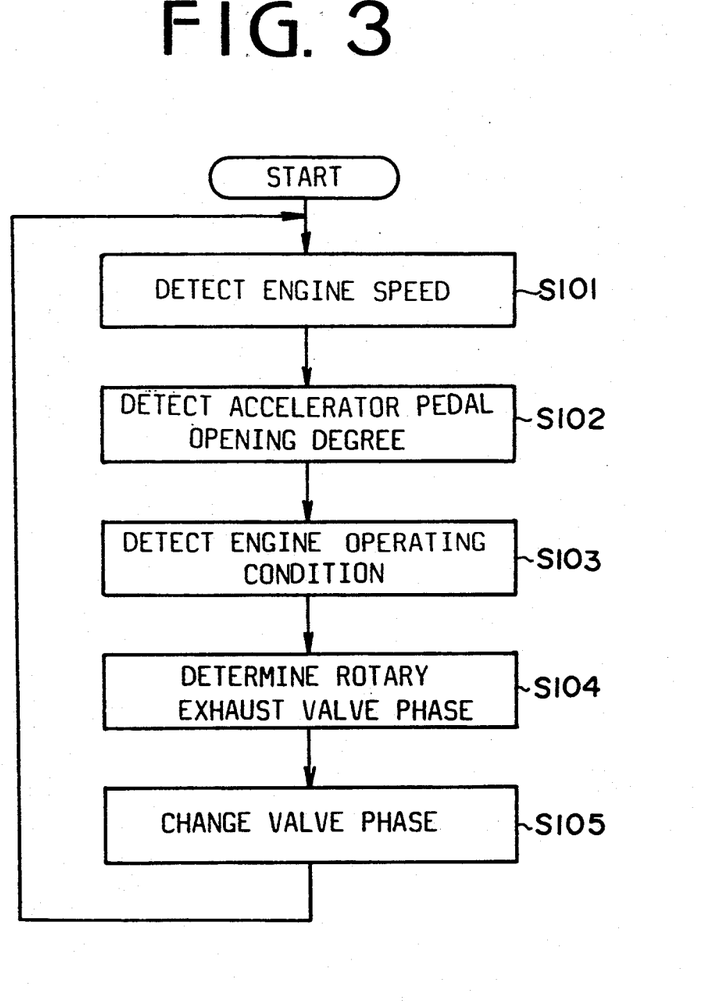
FIG. 3 is a flowchart showing an operation of the present invention.

Referring to the flowchart of FIG. 3, the engine speed N is detected by the engine speed sensor 51 at a step S101 and the accelerator pedal depressing degree $\phi$ is detected by the accelerator pedal depressing degree sensor 52 at a step S102. The engine operating condition is determined at a step S103 based on the engine speed N and the accelerator pedal depressing degree $\phi$. At a step S104, the valve phase is retrieved from the valve phase look-up table 63. At a step S105, the valve phase signal is applied to the actuator 47. In accordance with the valve phase signal, the actuator 47 protrudes or retracts the rod 48, thereby rotating the arm 42 and the tension pulley 43 about the pivot 41. The lengths of the tight side and of the slack side of the belt 38 change accordingly. Thus, the relative valve phase of the valve body 35a with respect to the crankshaft 5 changes and hence the opening and closing timings of the valve 35 are advanced or retarded.

Figure 4A:
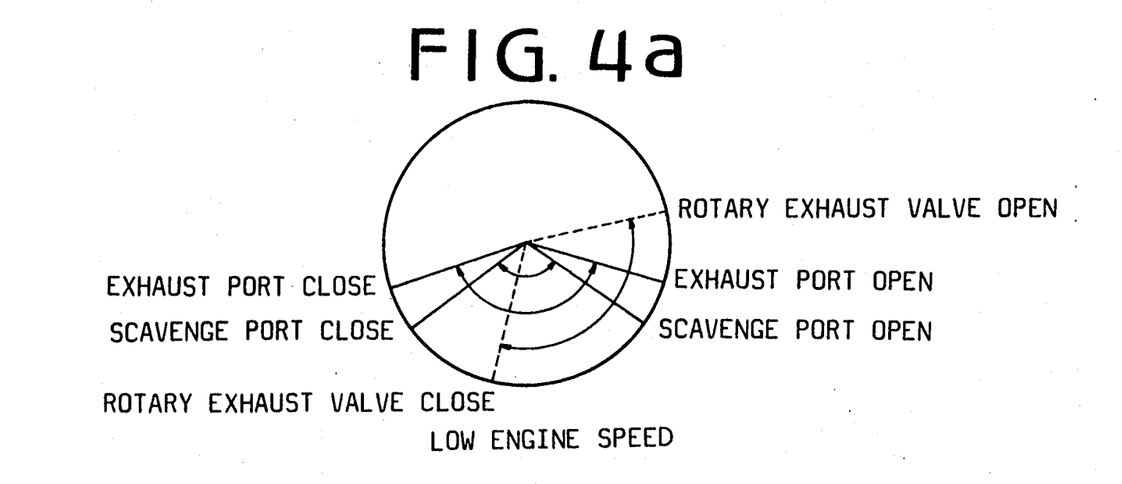
FIG. 4a to 4c and 5a to 5c are graphs showing opening and closing timings of the rotary exhaust valve at various engine operating conditions.

In a low engine speed range, the rod 48 protrudes from the actuator 47 so that the force exerted on the tension side of the belt 38 through the tension pulley 43 increases. The valve pulley 37 and hence the vale shaft 37a additionally turn in the clockwise direction shown by the arrow in FIG. 2b, thereby also turning the rotary valve body 35a to advance the phase thereof. Namely, the closing timing is advanced as shown in FIG. 4a so that sufficient quantity of the air is induced. Since the actual compression ratio is increased as a consequence, the output torque of the engine increases.

Figure 4B:
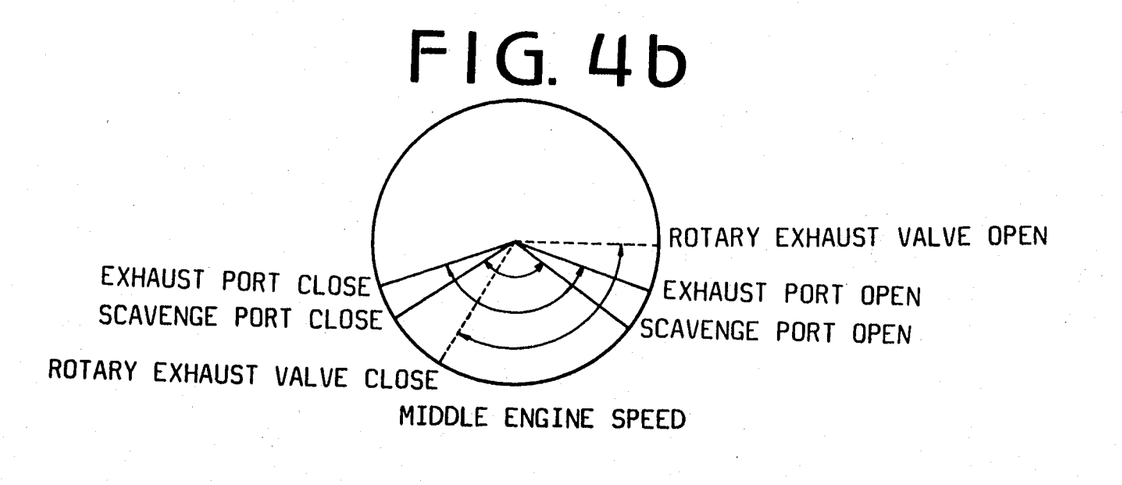
Figure 4C:
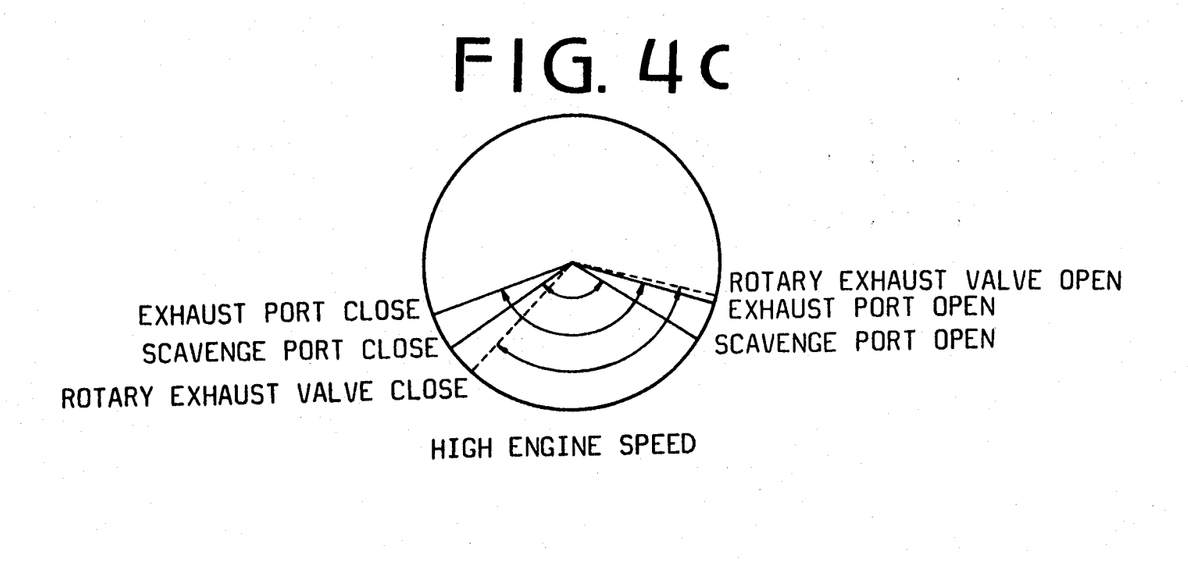

As the engine speed N becomes higher, the rod 48 of the actuator 47 is retracted. Therefore, the tension pulley 43 is released from the belt to reduce the abutting force. The tension of the belt 38 at the tension side deceases and the tension at the loose side is correspondingly increased by the operation of the spring 49 and the oil damper 50, thereby relatively turning the pulley 37 in the counterclockwise direction to change the phase of the valve shaft 37a relative to that of the crankshaft 5. Thus, closing timing of the rotary exhaust valve 35 is retarded as shown in FIG. 4b and 4c. The actual exhaust period, that is the period during which both exhaust port 11 and rotary exhaust valve 35 are open, becomes longer with increase of the engine speed. As a result, the cylinder 2 is sufficiently scavenged, excessive scavenge pressure is prevented, and the pumping loss is reduced thereby increasing the output torque of the engine 1.

Figure 5A:
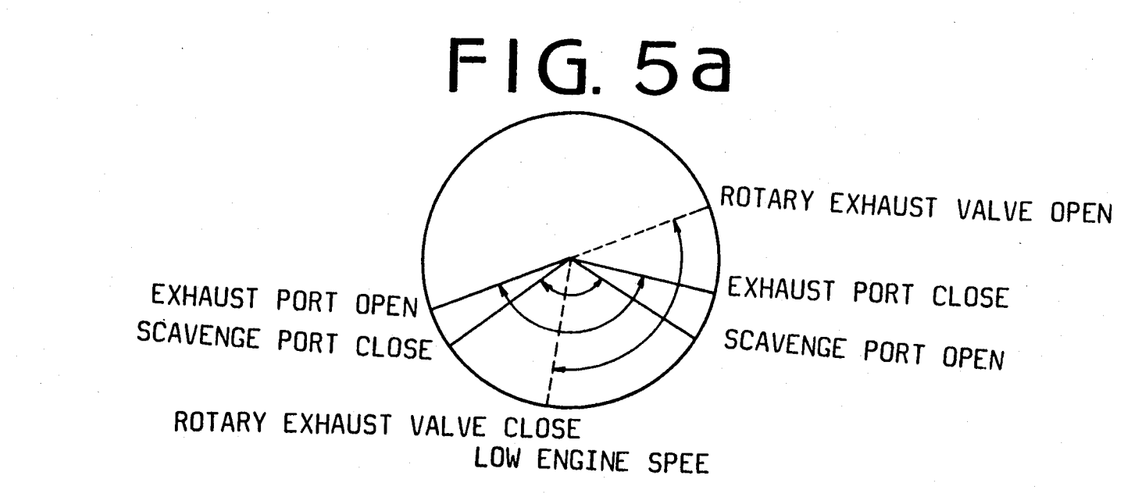
Figure 5B:
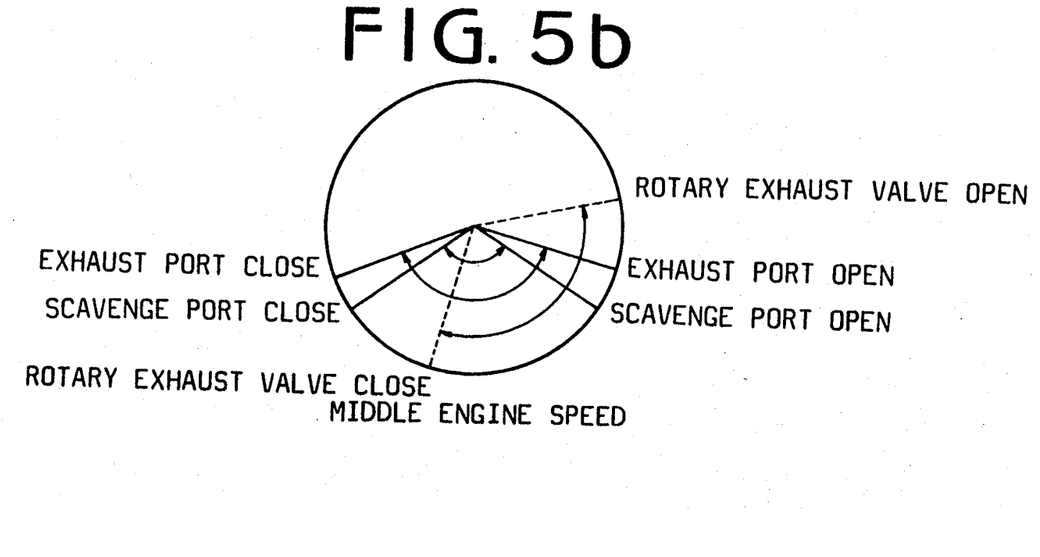
Figure 5C:
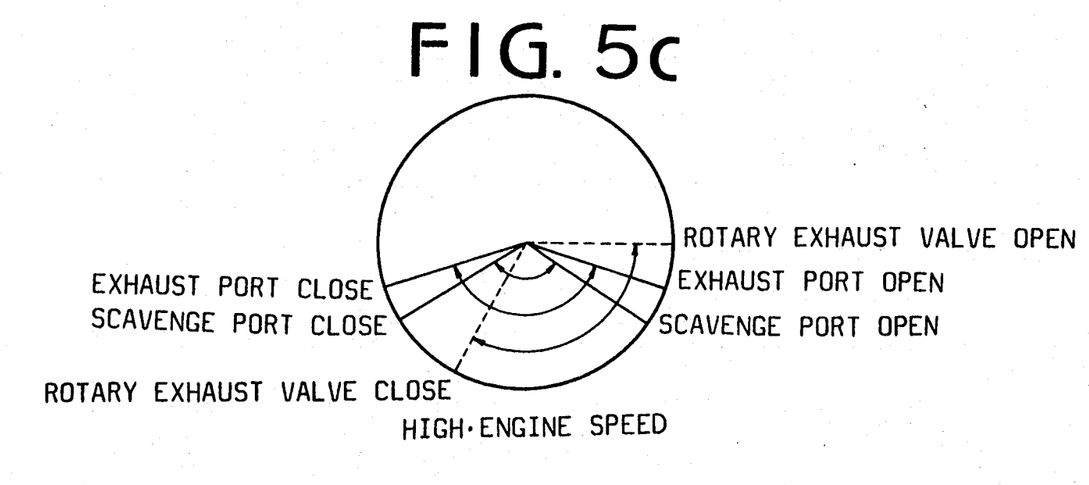

FIGS. 5a to 5c show opening and closing timings of the rotary exhaust valve 35 in a middle engine speed range at various engine loads. When the accelerator pedal 23 is released, the accelerator pedal depressing degree $\phi$ becomes zero. The rotary exhaust valve 35 is closed at an earlier timing as shown in FIG. 5a so that engine braking effect is increased. As shown in FIGS. 5b and 5c, the closing timing of the rotary exhaust valve 35 is retarded as the engine load increases.

From the foregoing it will be understood that the present invention provides a two-cycle engine having a direct fuel injection system where a rotary exhaust valve provided in the exhaust pipe is controlled independently on the engine operating conditions. Therefore, even if the quantity of the intake air is increased by the scavenge pump, the escape of air through the exhaust port is restrained. Thus output torque is increased in a wide engine speed range. A high compression ratio is obtained in a low engine speed range and in a light engine load range, thereby improviding fuel consumption. When the accelerator pedal is released for coasting the vehicle, the closing timing of the rotary exhaust valve is advanced so that the engine brake is sufficiently effectuated.

While the present preferred embodiment of the present invention has been shown and described, it is to be understood that this disclosure is for the purpose of illustration and that various changes and modifications may be made without departing from the scope of the invention as set forth in the appended claims.

What is claimed is:

1. A two-cycle engine having at least one cylinder, a scavenge port, an exhaust port, an intake passage communicated with said scavenge port, an exhaust passage communicated with said exhaust port, a scavenge pump provided in said exhaust passage, a rotary exhaust valve provided in said exhaust passage, means for rotating said scavenge pump and said rotary exhaust valve respectively, and a fuel injector provided for injecting fuel directly in the cylinder, the engine comprising:

valve phase control means for changing a phase of said rotary exhaust valve;

detector means for detecting engine speed and load on the engine and for producing an operating condition signal;

valve phase determining means responsive to said operating condition signal for determining the phase of said rotary exhaust valve and for producing a valve phase signal;

an actuator responsive to said valve phase signal for actuating said valve phase control means whereby changing the phase of said rotary exhaust valve in accordance with engine operating conditions.

2. The engine according to claim 1, wherein
   the detector means comprises an engine speed sensor, and
   a sensor for detecting depression degree of an accelerator pedal for the engine.

3. The engine according to claim 1, wherein
   said phase is advanced as the engine speed reduces.

* * * * *